Patented Dec. 28, 1948

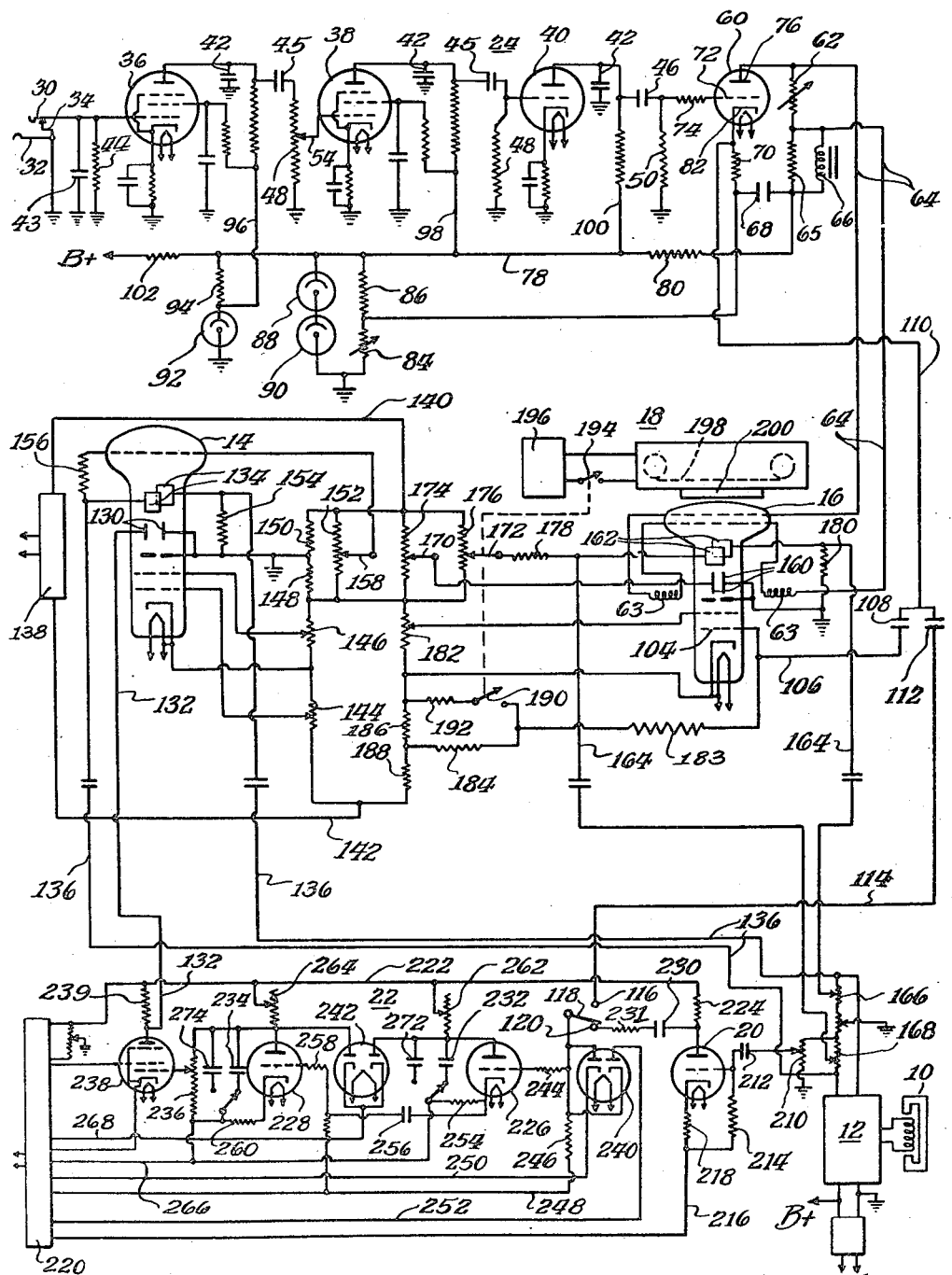

2,457,744

UNITED STATES PATENT OFFICE 2,457,744

INSTRUMENT USEFUL IN THE ANALYSIS OF VIBRATIONS IN ORGANIZED LIVING TISSUE

Ralph E. Sturm, Milton, Wis., assignor to The Burdick Corporation, Milton, Wis., a corporation of Delaware Application July 14, 1942, Serial No. 450,889

15 Claims. (Cl. 128—2.06)

My invention relates to improvements in instruments useful in the analysis of vibrations in organized living tissue, such as cardiac vibrations.

An instrument for this purpose is disclosed and claimed in Patent No. 2,294,015 granted to Oscar G. Salb and myself, on August 25, 1942, upon application Serial No. 285,028, filed July 17, 1939. The instrument faithfully visualizes and records the vibrations of the beating heart be they of a frequency above or below the range of audibility of the human ear or of large or small amplitude. It also visualizes and records vibrations produced by muscular contractions; by changes in heart muscle not great enough to produce definable changes in an electrocardiograph or to be audible with a stethoscope; and by deflections and obstructions in the bloodstream.

When the instrument is utilized to visualize and record heart vibrations, it is beneficial to correlate the visual or permanent record (made by photosensitive means) with, for example, some particular point in the period of the recurring phenomenon, such as the beginning of the systolic interval or phase. This point, which as the so-called "R" wave obtained with an electrocardiograph, has been generally accepted as a base or comparative point in diagnostic study of the electrocardiograms. The R wave is an electric wave, as distinguished from a vibration, and it has a distinct significance in cardiology. It is thus important in graphing heart vibrations within and without the audible range to be able to find thereon a region corresponding, for example, to the R wave of the electrocardiograph curve and to designate in that region a specific point relative to time which may be taken for all practical purposes as the beginning of the systolic phase. In the case of vibrations emanating from a normal heart, the location of such a point is a relatively simple matter because the vibrations in the systolic phase are well defined and pronounced and easily identifiable.

However, the beginning of the systolic phase may not be susceptible of identification in the case of vibrations emanating from an abnormal heart, so that the location of the R wave may be difficult—and not infrequently impossible.

Heretofore it has been the practice to locate on heart vibration curves a point corresponding to the R wave of the electrocardiogram by simultaneously producing an electrocardiogram and a vibration curve and, after determining the R wave on the former, to mark the corresponding point on the latter. This procedure, of course, requires the presence of and simultaneous use and proper synchronization of both an electrocardiograph and vibration detecting apparatus.

An object of my invention is to provide means for marking or indicating on the vibration graph or curve a line or point which for all practical purposes may be considered the beginning of the systolic phase or interval—at least a line or point that may be readily noted and taken as the basis for time comparison between the electrical phenomena produced by muscular activity of the heart and vibrations emanating from the heart.

A more specific object of my invention is to provide an apparatus which will enable a heart vibration detecting or recording instrument to indicate, directly and without comparison with any other graph or curve, a point corresponding to or, for diagnostic purposes, susceptible of the same use as, the beginning of the R wave of the electrocardiogram.

Another object of my invention is to provide a new and improved apparatus of the character specified in the preceding paragraph in which the indication of the point of occurrence of the R wave is made by an electrically actuated device and the intensity of the electrical means is increased when the indication is made to provide a more positive indication.

A further object of my invention is the provision of a new and improved vibration visualizing apparatus wherein the vibration curve is periodically repeated, in which the repetition is initiated at a point corresponding to the beginning of the R wave.

A further object of my invention is the provision of an apparatus of the character specified in the preceding paragraph in which the vibration curve may be periodically repeated from an initial point corresponding to the beginning of the R wave or from some other point.

Other objects and advantages of my invention will become apparent hereinafter in the course of the description of an embodiment of the invention during which reference will be had to the drawing, the single figure of which is a schematic diagram of an apparatus embodying the invention.

In order better to describe the present invention, it has been illustrated in conjunction with and as applied to an instrument that is disclosed in the previously mentioned copending application, Serial No. 285,028, now Patent No. 2,294,015. In general, this instrument includes a pickup 10 capable of translating mechanical vibrations into electrical waves, an amplifier 12 of conventional construction to the input of which the pickup is connected and the output of which is connected to a cathode ray tube 14 adapted to indicate and visually to represent the vibrations and a second cathode ray tube 16 also adapted to indicate the vibrations and having associated therewith motor driven photographic means 18 for making permanent records of the vibrations. The instrument also includes means for controlling the sweep of the cathode ray beam across the screen of tube 14, which means includes an amplifier 20 connected to the output of amplifier 12, a sweep circuit, and a sweep circuit control circuit, both indicated generally by reference character 22. These component parts of the instrument are all disclosed and fully described in the copending application, now Patent No. 2,294,015, but in order that my invention and its advantages may be fully comprehended, they will be described briefly hereinafter.

In order to provide an indication of a particular point in the period of the recurring phenomenon, preferably the beginning of the R wave, there is provided an amplifier, indicated generally by reference character 24, so constructed and arranged as to produce an electric impulse of short duration and considerable magnitude, which impulse is utilized (1) to control the cathode ray tube 16 to produce a distinctive mark upon the record provided by its beam which is photographically recorded; (2) to increase the intensity of the cathode ray beam of tube 16 more effectively to make the record; (3) and, if desired, to control the sweep circuit associated with tube 14 to synchronize it with the beginning of the R wave.

The amplifier is constructed so that only frequencies of the order of frequency of the R wave are amplified to any considerable extent. The frequency response of the amplifier is such that frequencies between about 10 and 18 cycles per second are amplified the greatest amount. This is accomplished by bypassing higher frequencies (such as 60 cycle induction in an unshielded patient) so that they do not appear in the amplifier output. The amplifier is also arranged to attenuate frequencies lower than that of the R wave, so as to minimize the effect of line voltage surges and to attenuate the T wave. The T wave is another electrical wave generated by the heart, but it is normally of lower frequency and amplitude than the R wave. The P wave, having a frequency near that of the R wave is amplified, but its magnitude is generally so small compared to the R wave its presence does not affect the operation of the apparatus.

The amplifier input terminals 30 and 32 are adapted to be connected to the patient's body through a suitable cable and plug (not shown). The latter terminal is grounded and when the device is not used the two terminals are connected by a switch 34, which is opened when the cable plug is inserted between the terminals. The amplifier input terminals are connected to the patient's body with the terminal 30 connected to the right arm and the terminal 32 to the left leg. Other parts of the body may be used and good results have been obtained with the terminal 30 placed near the right shoulder and the terminal 32 placed near the end of the ribs on the left side of the chest.

The electrical waves supplied to the amplifier input terminals are amplified by the tubes 36, 38, and 40, the first two of which may be of the 6SJ7 type and the third of the 6J5 type. These tubes are resistance-capacity coupled to operate as a cascade amplifier.

In order to attenuate the higher frequencies such as those resulting from 60 cycle induction generally present when the amplifier is connected to an unshielded body, bypass condensers 42 are connected between the plates of the amplifier tubes and ground and a condenser 43 and resistor 44 are connected in parallel between the grid of the first tube 36 and ground.

In order to attenuate frequencies lower than that of the R wave, such as the T wave, and to minimize the effect of line voltage surges, the interstage coupling condensers 45, the amplifier output coupling condenser 46, the interstage coupling resistors 48, and the output coupling resistor 50 are chosen to provide a time constant which limits the low frequency response of the amplifier. This arrangement thus greatly attenuates the T wave so that it is not present to any substantial extent in the amplifier output.

The gain of the amplifier is adjustable by a movable gain control member 54 associated with the coupling resistor 48 located between amplifier tubes 36 and 38.

The amplified R wave is utilized to produce a current surge through an oscillatory circuit having values chosen so that the circuit approaches a critically damped condition. By so arranging the circuit control, the impulse derived therefrom and utilized to provide the distinctive mark corresponding to the R wave causes the cathode ray beam to move slowly at the top of the peak and faster as it descends. Consequently, the photographed record of the beam is given a distinctive appearance so that it may be readily recognized in the presence of other waves from the vibration detector which are usually occurring to some extent at the time the R wave is present.

The oscillatory circuit includes a gas tube 60, an adjustable resistor 62, a pair of series connected deflecting coils 63 associated with cathode ray tube 16 connected across resistor 62 by conductors 64, a resistor 65 and choke coil 66 in parallel, a condenser 68, and a resistor 70. The grid 72 of the gas tube is connected to the junction of coupling condenser 46 and coupling resistor 50 through a resistor 74. The plate 76 of the gas tube is supplied with B potential from a B supply line 78 through a resistor 80 and the previously mentioned resistors 62 and 65. The cathode 82 of the gas tube is placed in series with the resistor 70 and an adjustable resistor 84, one end of which is grounded and the other end connected to the B supply line 78 through a fixed resistor 86. The resistor 84 is adjusted until the grid 72 of the gas tube is sufficiently negative with respect to the cathode to maintain the tube non-conductive in the quiescent state. When non-conductive, the condenser 68 is charged to the voltage appearing across the resistor 86.

Upon the occurrence of an R wave, the R wave is ampliled by the amplifier and the grid 72 of the gas tube made more positive to render the tube conductive. It may be well to note at this point that during the occurrence of the R wave, the right arm (to which amplifier input terminal 30 is connected) is negative with respect to the left leg so that with a three tube amplifier such as that shown, this negative potential makes the grid 72 of the gas tube more positive.

In order to regulate the voltage of the B supply, a pair of voltage regulator tubes 88 and 90 are connected in parallel with the series connected resistors 84 and 86. These tubes may be of the VR150 type. Additional voltage regulation is provided by a third tube 92 also of the VR150 type connected to the B supply line through a current limiting resistor 94. Plate voltage for the first amplifier tube 36 is supplied by a conductor 96 connected to the junction of the tube 92 and resistor 94. The plate voltage for the tubes 38 and 40 is supplied through conductors 98 and 100 which are connected directly to the B supply line 78. The latter is preferably connected to the B supply line for the amplifier 12 through a current limiting resistor 102. The tubes 88 and 90 thus not only serve as voltage regulators for the amplifier 24, but also serve to decouple the amplifiers 12 and 24. The tube 92 regulates the already regulated voltage of the tubes 88 and 90 so that a very well regulated B voltage is obtained for the amplifier tubes.

The previously mentioned deflector coils 63 associated with cathode ray tube 16 are connected in series in such manner that upon the discharge of the gas tube 60, the magnetic field created by the coils deflects the cathode ray beam of tube 16 in an upward derection. The coils are located one on each side of the cathode ray tube 16 and near the electrostatic deflection plates.

The use of a gas tube in the oscillatory circuit limits the current flowing in this circuit to a single half cycle since the gas tube conducts only in one direction. Consequently, the deflection coils 63 cause the cathode ray beam of tube 16 to be deflected upward and then back to the base line at the instant the R wave occurs.

The inductance 66 in the oscillatory circuit is utilized to provide the necessary lumped inductance to make the oscillatory circuit approach the critically damped condition since the inductance of the deflecting coils 63 is small by comparison to the required value. The resistor 65 in parallel with the inductance renders the latter less effective but it may be dispensed with by selecting a different value of inductance and increasing the value of the resistor 70.

The extent of the excursion of the cathode ray beam of tube 16 in response to the discharge in the oscillatory circuit is controllable by the adjustable resistor 62. It may be noted also that the resistor 70 serves not only to provide part of the resistance to give the proper parameters for the oscillatory circuit, but also to limit the peak current discharged through the gas tube 60.

The discharge of the condenser 68 through the gas tube 60 is utilized also to increase the intensity of the cathode ray beam of tube 16 and, if desired, to control the sweep circuit of cathode ray tube 14. The intensity of the beam of tube 16 is increased by utilizing the discharge of the condenser 68 to increase the potential of the grid 104 of the tube 16. This grid is connected to the cathode side of resistor 70 through conductor 106, condenser 108, and conductor 110. When the condenser 68 discharges upon the tube 60 being rendered conductive in response to the occurrence of the R wave, the cathode potential rises momentarily. This increased potential is applied to the grid of tube 16 to increase the intensity of the cathode ray beam momentarily, so that the photographic record of the beam, which moves rapidly when deflected to provide the indication of the R wave, is made of more nearly the same quality as that of the beam when deflected in response to heart vibrations.

The discharge of the condenser 68 through the gas tube may be utilized also to control the sweep circuit of visual tube 14, thus orienting the user of the apparatus as to events occurring in the cardiac cycle when viewing same in the visual tube. When the R wave is thus utilized to control the sweep circuit, the user knows that the visual wave starts at the ventricular systole of each heart beat. To accomplish this control, the cathode side of resistor 70 is connected also to the sweep circuit control through the conductor 110, a condenser 112, and a conductor 114 leading to a switch contact 116. The switch contact has associated with it a two-position switch 118 movable from engagement with a contact 120, in which position it is shown, to engage the contact 116. With the switch blade in engagement with contact 120, the sweep circuit is controlled by vibrations amplified by the amplifiers 12 and 20 and when it is in engagement with contact 116, the sweep circuit is controlled in response to the occurrence of the R wave.

The cathode ray tubes and associated circuits will now be described briefly. The visual tube 14 includes deflector electrodes in the form of electrostatic plates 130 for producing horizontal sweep of the beam, one of which is grounded and the other connected by conductor 132 to the sweep circuit control 22, which will be described later. The tube also includes electrostatic plates 134 for deflecting the beam vertically in response to the amplified vibration waves supplied thereto from the output of amplifier 12 through conductors 136. Power for tubes 14 and 16 is supplied from a suitable source indicated by reference character 138 through conductors 140 and 142 connected to a resistance network including the resistors 144 and 146 connected in series with each other and with the parallel connected resistors 148, 150 and 152. The junction of resistors 148 and 150 is connected to ground and to one of deflector plates 130 and through resistor 154 to one of deflector plates 134. In order to center the beam, the other deflector plate 134 is connected through resistor 156 and adjustable connection 158 to resistor 152. The grids of the tube are adjustably connected to resistors 144 and 146 and the cathode is connected between the two resistors.

Cathode ray tube 16 also includes a pair of horizontal deflector electrodes, these being the electrostatic plates 160 and the vertically deflecting plates 162. The latter are connected to an adjustable portion of the output of the amplifier 12 through conductors 164 and the resistors 166 and 168. The beam is centered by adjustable members 170 and 172 associated with the parallel connected resistors 174 and 176 of the resistance network, member 170 being connected to one of deflector plates 160 and member 172 to one of plates 162 through resistor 178. The other deflector plate 160 is grounded and the other plate 162 is connected to ground through resistor 180. The focusing grid of the tube is adjustably connected to resistor 182 and the other, the main control grid 104 to which reference was previously made, is connected through resistor 183 (of high value) and resistor 184 to the junction of resistors 186 and 188 also forming part of the resistance network. A switch 190 is operable into circuit closing position to connect one end of a resistor 192 to the junction of resistors 183 and 184. The other end of resistor 192 is connected to the junction of resistor 182 and 186. The resistors 186 and 188 have values such that when switch 190 is open, the potential applied to control grid 104 is such as to cut off the beam of tube 16. When the switch is closed, the grid potential is changed so that the tube 16 produces a beam. The cathode of tube 16 is connected to the junction of resistors 182 and 186.

The switch 190 is provided so that a photographic record of the heart vibrations can be made when desired and it is mechanically coupled to a switch 194 controlling the energization of the film driving motor 196. Thus when the motor is operated to drive the film 198, the cathode ray tube is activated. The beam passes through a suitable lens system 200 and its movement is recorded upon the film.

The sweep circuit control is constructed and arranged so as to enable the beam of the visual tube 14 to sweep horizontally in synchronism with the heart vibrations, the sweep in indicating direction being initiated in response to a heart vibration of predetermined magnitude as described in the previously mentioned copending application now patent No. 2,294,015, or in response to the occurrence of the R wave in accordance with the preferred embodiment of my invention. The initiation of the sweep upon occurrence of the R wave has the advantage, as already indicated, of enabling the user easily to correlate the heart vibrations with the R wave of the electrocardiogram.

The sweep circuit control 22 is connected across a portion of the ouput of amplifier 12 through resistor 210, and a coupling condenser 212 connected to the grid of the amplified 20 and to resistor 214. The latter is connected also to a conductor 216, to which the cathode of tube 20 is connected through resistor 218. Conductor 216 is connected to ground through a voltage divider (not shown) forming part of the power supply 220 for the sweep circuit control. The plate of tube 20 is connected to a B supply line 222 through resistor 224.

The amplifier output is coupled to a pair of tubes 226 and 228 of the gaseous type (such as the type 884) through condenser 230, resistor 231, and the previously mentioned switch 118 when the latter is in its indicated position. The tubes 226 and 228 are utilized to control the charging and discharging of condensers 232 and 234 and the change in voltage across a resistor 236 in parallel with condenser 234 to which the grid of amplifier tube 238 is adjustably connected. The plate of tube 238 is connected to the conductor 132 through which the voltage of one of deflector plates 130 is varied to effect sweep of the beam of the visual tube 14 and to the B supply through resistor 239. The sweep circuit control also includes a pair of voltage limiter tubes 240 and 242.

The sweep circuit may be controlled to initiate the sweep of the beam of the visual tube either in response to the R wave or a vibration, depending upon the position of switch 118. In the two positions of the switch, upon occurrence of the vibration or the R wave, the grid of tube 226 is made more positive to render the tube conductive, the grid being connected to the switch blade through resistor 244 and to the power supply through resistors 244 and 246 and conductor 248.

There is a distinct advantage in connecting the R wave impulse supplied from amplifier 24 to the grid of trip tube 226 through switch 118, as the changeover to R wave control as well as adjustment of the R wave amplifier and associated parts can be made without making any adjustments to limit the surge applied to the grid of the trip tube 226, the voltage limiter tube 240 being effective to limit the voltage applied to the grid of the tube 226 from the R wave amplifier just as it limits the voltage applied to that grid from amplifier 20. The voltage limiter tube 240, it will be noted, is a double diode (of the 6H6 type), having the anode of one section and the cathode of the other section connected to the switch 118 and the corresponding cathode and anode of the two sections connected through conductors 250 and 252 to voltage sources at potentials above and below the potential of the voltage source to which the grid of tube 226 is connected through conductor 248. Accordingly, one of the diode sections becomes conductive when the potential of the grid of tube 226 rises above a predetermined value and the other section when the grid potential falls below a predetermined value. As a result, the tube 226 is rendered conductive during the initial portion of an amplified vibration and its potential is prevented from varying beyond the limits provided by the tube 240.

Once tube 226 is rendered conductive, the condenser 232 discharges through the tube 226, the discharge circuit including the tube, the condenser and a resistor 254. The cathode end of resistor 254 is connected through condenser 256 and resistor 258 to the grid of gas tube 228 to render the latter conductive at substantially the same time as tube 226. Tube 228 thus discharges condenser 234 through a circuit including the tube, the condenser, and resistor 260. The resistors 254 and 260 in the discharge circuits are of low value to enable the condensers to discharge rapidly. After discharge the tubes again become non-conductive and the condensers 232 and 234 are charged gradually at rates dependent upon the values of resistors 262 and 264, respectively. One end of resistor 262 is adjustably connected to the B supply line 222 and its other end to the plate of one section of limiter tube 242, the condenser 232 and the plate of tube 226. The other end of the condenser is connected to resistor 254 and the junction of these is connected to the power supply through conductor 266. One end of resistor 264 is adjustably connected to the B supply line 222 and its other end to the plate of tube 228, condenser 234, resistor 236, and the plate of the other section of tube 242. The other end of condenser 234 is connected to the junction of resistors 236 and 260 and the conductor 266. The cathodes of both sections of tube 242 are connected to the power supply through conductor 268.

The charging time of condenser 232 is adjusted to take approximately the full length of the heart cycle to charge it so that once the tube 226 has been tripped, it will not again be tripped by succeeding vibrations. Since the condenser is charged gradually the plate voltage of tube 226 is built up gradually and does not reach a value at which the tube can be rendered conductive until near the end of the heart cycle. It should be remembered that the grid voltage of tube 226 is limited by tube 240 so that the plate voltage must be at its full value before the tube can be tripped.

When tube 228 is rendered conductive, condenser 234 is discharged with the result that voltage applied to the grid of tube 238 through resistor 236 is changed rapidly. The plate voltage of tube 238 also changes rapidly and since this voltage is applied to one of the horizontal deflector plates 130 of cathode ray tube 14, the beam is rapidly moved from right to left. This movement is so rapid it can hardly be seen.

Once the condenser 234 is discharged, the tube 228 becomes non-conductive and the condenser 234 is charged at a rate determined by adjustable resistor 264. The charging of the condenser gradually increases the voltage applied to the grid of tube 238 and changes the plate voltage with the result the voltage of the deflector plates of the cathode ray tube is varied gradually to move the beam across the screen of tube 14 so that its deflection in response to the amplified heart vibrations can readily be observed.

The two sections of limiter tube 242 have potentials applied to them so that they become conductive at a time when the condensers 232 and 234 have reached the uppermost portion of their substantially linear charging rates. This, in the case of condenser 234, insures uniform movement of the beam of cathode ray tube 14 across the screen. Amplifier 238 also has its cathode so connected to the power supply that its grid potential is varied to operate the tube on that portion of its characteristic curve that insures most uniformity of movement of the cathode ray beam in response to the charging of condenser 234.

Condensers 272 and 274 may be substituted for condensers 232 and 234, respectively, in the event it is desired visually to observe only a lesser portion of the vibrations of the heart cycle, as described in the previously mentioned copending application now Patent No. 2,294,015.

Before proceeding with the review of the operation of the apparatus as a whole, it may be well briefly to mention that the pickup 10, which has been illustrated but diagrammatically, is of the dynamic type adapted to pick up vibrations emitted by the heart at the chest wall. The pickup is connected to the chest wall by a connection composed wholly of substantially inelastic material so that vibrations both within and without the audible frequency range may be faithfully communicated from the chest wall to the dynamic pickup. It should be noted that the advantages of the present invention are realizable even though other forms of pickup are used or vibrations other than those emitted by the heart are detected.

In the description of the operation, it is assumed that the two-position switch 118 is in engagement with contact 116 to connect the R wave amplifier 24 to the grid of the trigger tube 226 so that the sweep circuit is controlled in response to the occurrence of the R wave. The input terminals 30 and 32 of the R wave amplifier are connected to the right arm and left leg of the patient with the result that the R wave is amplified by the amplifier which is constructed to filter out the higher frequencies and to attenuate the lower frequencies such as those characterizing the T wave. Upon occurrence of the R wave, the gas tube 60 is rendered conductive and the condenser 68 is discharged through the tube and through the deflector coils 63 of the cathode ray tube 16 associated with the photographic apparatus. This, as heretofore described, results in a pronounced deflection of the cathode ray beam to leave a distinctive mark upon the film, assuming for the moment that both the cathode ray tube and the photographic apparatus have been placed in operation by the closure of switches 190 and 194. This distinctive mark is made upon the film when the tube and photographic apparatus have been placed in operation irrespective of whether or not the pickup 10 has been placed upon the chest wall of a patient to detect the heart vibrations.

With the pickup placed upon the chest wall to detect the heart vibrations, the electrical waves from the pickup are amplified by the amplifier 12 and supplied to the vertical deflector plates 134 of the visual cathode ray tube 14 and to the vertical deflector plates 162 of the recording cathode ray tube 16. Only a portion of the total amplifier output is supplied to the latter since it is contemplated that the latter be a somewhat smaller tube and, therefore, not requiring the same degree of deflection. Each time that the R wave appears, an impulse is supplied not only to the deflector coil 63 of the recording cathode tube, but also to the grid 104 of this tube and to the grid of the trigger tube 226. The impulse supplied to the grid 104 of tube 16 increases the intensity of the cathode ray beam so that the deflection of the beam is recorded photographically with much the same intensity as the heart vibration deflections, in spite of the rapid movement of the beam. The impulse supplied to the grid of tube 226 renders the latter tube conductive and it, in turn, renders conductive the tube 228 with the result that the condenser 234 is quickly discharged to effect a quick return of the cathode ray beam to its initial starting position for indicating the heart vibrations—usually to the left side of the screen as viewed from the front. Once the tubes have been rendered conductive and the condensers associated therewith discharged, the tubes again become non-conductive and the condensers are charged gradually at adjustable rates and the charging of condenser 234 effects, as heretofore described, a gradual movement of the beam of the visual cathode ray tube 14 from the left to the right. As the beam moves in this direction, it is deflected in a vertical plane in response to the output of the amplifier 12 to give a faithful representation of the heart vibrations. The charging time of condenser 234 is so adjusted that it is fully charged shortly before the occurrence of a succeeding R wave. The same is true of the charging time of condenser 232. As a result, the sweep circuit control is conditioned for a further tripping and sweeping operation upon the occurrence of successive R waves.

As heretofore pointed out, the utilization of the voltage of the R wave to initiate the indicating movement of the beam of the visual cathode ray tube enables the operator at once to correlate the vibrations indicated on the screen with the R wave of the electrocardiogram. Similarly, the placing of a unique mark or beacon, as it might be termed, upon the photographic film provides a ready reference point for correlating the recorded curves with an electrocardiogram.

While special reference has been made to the use of the present invention as an electrocardioinstrument, it is also useful in the detection of vibrations generally, particularly where the vibrations occur regularly or irregularly during a definite cycle of operation. While but a single embodiment of the invention has been described, it should be understood that this embodiment is susceptible of modification. For instance, the R wave could be indicated upon the visual tube by the addition of another deflector coil arrangement similar to that utilized in connection with the recording tube. Furthermore, potential waves other than the R wave could be used to control the apparatus in the same manner as the R wave.

Having thus illustrated and described one embodiment of my invention and explained the nature thereof, what I claim and desire to secure by United States Letters Patent is as follows:

1. Apparatus for providing a distinctive mark of the occurrence of an electric potential wave generated by the heart upon an indication of heart vibrations of a patient produced by a cathode ray tube having its beam deflected in one direction in response to the vibrations, including in combination, an amplifier, means for supplying the input of said amplifier with electric potentials generated by the heart of the patient, means connected to and controlled in response to the output of said amplifier for producing a substantially constant characteristic electrical impulse of brief duration upon occurrence of the wave, and means for deflecting the cathode ray beam in said one direction in response to said impulse, thereby to provide distinctive marks or beacons indicating the occurrence of the potential waves.

2. Apparatus for providing a distinctive mark of the occurrence of the R wave generated by the heart upon an indication of heart vibrations of a patient produced by a cathode ray tube having its beam deflected in one direction in response to the vibrations, including in combination, an amplifier arranged to amplify frequencies of the order of the R wave, means for supplying the input of said amplifier with electric potentials generated by the heart of the patient, means connected to and controlled in response to the output of said amplifier for producing a substantially constant characteristic electrical impulse of brief duration upon occurrence of the R wave, and means for deflecting the cathode ray beam in said one direction in response to said impulse, thereby to provide distinctive marks or beacons indicating the occurrence of the R waves.

3. Apparatus for providing a distinctive mark of the occurrence of the R wave generated by the heart upon an indication of heart vibrations of a patient produced by a cathode ray tube having its beam deflected in one direction in response to the vibrations, including in combination, an amplifier, means for supplying the input of said amplifier with electric potentials generated by the heart of the patient, means including discharge circuit and a gas tube connected to the output of said amplifier and rendered conductive upon occurrence of the R wave for producing an electrical impulse of brief duration in said discharge circuit, and means coupling said discharge circuit to the cathode ray tube for deflecting the cathode ray beam in said one direction in response to said impulse, thereby to provide distinctive marks indicating the occurrence of the R wave.

4. Apparatus for providing a distinctive mark of the occurrence of the R wave generated by the heart upon an indication of heart vibrations of a patient produced by a cathode ray tube having its beam deflected in response to the vibrations, including in combination, an amplifier, means for supplying the input of said amplifier with electric potentials generated by the heart of the patient, means including an oscillatory circuit comprising a gas tube coupled to the output of the amplifier and rendered conductive upon each occurrence of the R wave and a condenser adapted to be discharged through said tube and circuit when the tube is rendered conductive for producing electrical impulse of short duration upon occurrence of the R wave, and means for deflecting the cathode ray beam in response to said impulse.

5. Apparatus for providing a distinctive mark of the occurrence of the R wave upon an indication of heart vibrations of a patient produced by a cathode ray tube having its beam deflected in response to the vibrations, including in combination, an amplifier, means for supplying the input of said amplifier with electric potentials generated by the heart of the patient, means connected to the output of said amplifier for producing an electrical impulse upon occurrence of the heart wave and for deflecting the cathode ray beam in a distinctive manner in response to said impulse, said means including, a gas tube having a plate, grid and cathode, said grid being connected to the amplifier output and so biased that the tube is rendered conductive upon occurrence of the R wave, and an oscillatory circuit connected in the plate-cathode circuit of said tube including electric current actuated means for deflecting the cathode ray beam and a condenser adapted to be discharged through the tube to render said deflecting means effective to move the beam when said tube is rendered conductive.

6. An apparatus as claimed in claim 5, in which the oscillatory circuit has characteristics approaching a critically damped circuit.

7. Apparatus for providing a distinctive mark upon occurrence of an electric potential wave generated by the heart upon an indication of heart vibrations of a patient produced by means deflected in response to the vibrations, including in combination, an amplifier, means for supplying said amplifier with electric potentials generated by the heart of the patient, means connected to the output of said amplifier for producing a distinctive electric impulse upon occurrence of the wave, means for deflecting said vibration indication producing means in response to said impulse, and means operable upon occurrence of said impulse for increasing the intensity of the indication.

8. Apparatus for providing a distinctive mark upon occurrence of the R wave generated by the heart upon an indication of heart vibrations of a patient produced by a cathode ray tube having beam deflector plates and a beam intensity controlling grid, including in combination, an amplifier arranged to amplify frequencies of the order of the R wave, means for connecting the input of the amplifier to the patient, means including a condenser and a gas tube connected to the output of the amplifier and rendered conductive upon occurrence of the R wave to enable the condenser to discharge through the tube for producing a distinctive electric impulse, a resistor in the discharge circuit between the condenser and cathode of the gas tube, and means including a connection from the cathode side of said resistor to the grid of the cathode ray tube for increasing the intensity of the cathode ray beam upon occurrence of the impulse.

9. Apparatus for representing vibrations within a heart cycle on the viewing screen of a cathode ray tube, including in combination, means for detecting heart vibrations and translating them into electrical waves, means for deflecting the cathode ray beam in response to said waves, means including a timing circuit for moving said beam across the viewing screen of the tube, and electrically responsive means responsive directly to amplified electric potentials generated by the heart and controlling said last mentioned means for initiating operation thereof to move said beam across the viewing screen.

10. Apparatus for representing vibrations within a heart cycle on the viewing screen of a cathode ray tube, including in combination, means for detecting heart vibrations of a patient and translating them into electrical waves, means for deflecting the cathode ray beam in response to said waves, a timing circuit for moving said beam across the viewing screen of the tube, and means controlling said timing circuit for initiating operation thereof to move said beam across the viewing screen, said last mentioned means including an amplifier having an input adapted to be connected to the patient and arranged to amplify frequencies of the order of the R wave generated by the heart, a gas tube having a grid, plate and cathode, said grid being connected to the amplifier output and so biased that the tube is rendered conductive upon occurrence of the R wave, a condenser and a resistor in the plate-cathode circuit of the tube, said condenser discharging through said resistor and tube when the tube is rendered conductive, and a connection from the cathode end of said resistor to said timing circuit.

11. In apparatus of the type wherein heart vibrations are visually indicated upon the screen of a cathode ray tube having associated therewith a sweep circuit and the indications of a second cathode ray tube are photographically recorded, the combination including, an amplifier arranged to amplify frequencies of the order of the R wave generated by the heart, means for supplying said amplifier with electric potentials generated by the heart, means connected to the amplifier for producing a distinctive electric impulse upon occurrence of the R wave, means actuated in response to the occurrence of the impulse for initiating operation of the sweep circuit of the first cathode ray tube to move the beam across the viewing screen, means simultaneously actuated in response to the occurrence of the impulse for distinctively deflecting the beam of the second cathode ray tube, and means also simultaneously actuated in response to the occurrence of the impulse for increasing the beam intensity of the second tube.

12. Apparatus for representing vibrations within a heart cycle on the viewing screen of a cathode ray tube, including in combination, means for detecting heart vibrations and translating them into electrical waves, means including an amplifier for deflecting the cathode ray beam in response to said waves, means including a timing circuit for moving said beam across the viewing screen of the tube, and means for selectively controlling said last mentioned means to initiate operation thereof to move the beam across the tube in response to said vibrations or in response to an electric potential generated by the heart.

13. Apparatus for representing vibrations within a heart cycle on the viewing screen of a cathode ray tube, including in combination, means for detecting heart vibrations and translating them into electrical waves, means including an amplifier for deflecting the cathode ray beam in response to said waves, a sweep circuit for sweeping the beam across the viewing screen of the tube, means including a grid controlled gas tube adapted to be rendered conductive for initiating operation of sweep circuit to sweep the beam, means for producing an electric impulse upon the occurrence of the R wave generated by the heart, switch means for selectively connecting said grid to said amplifier or impulse producing means to render said tube conductive upon occurrence of a vibration or the R wave, and voltage limiting means connected to said grid to limit the voltage change of said grid.

14. Apparatus for producing an electrical impulse upon occurrence of the R wave generated by the heart of a patient, including in combination, an amplifier having an output and an input adapted to be connected to the patient and arranged to amplify frequencies of the order of the frequency of the R wave, a gas tube having a grid, plate and cathode, said grid being connected to the output of the amplifier, means biasing said tube so that it is rendered conductive only upon occurrence of the R wave, a condenser and a resistor in the plate-cathode circuit of the tube and means charging said condenser when the tube is non-conductive, whereby said condenser discharges through said tube and resistor when the tube is rendered conductive upon occurrence of the R wave.

15. Apparatus for producing an electrical impulse upon occurrence of the R wave generated by the heart of a patient, including in combination, an amplifier having an output and an input adapted to be connected to the patient and arranged to amplify frequencies of the order of the R wave, a gas tube having a grid, plate and cathode, said grid being connected to the output of the amplifier, means biasing said tube so that it is rendered conductive only upon occurrence of the R wave, and an oscillatory discharge circuit in the plate-cathode circuit of the tube including a condenser charged when the tube is non-conductive and discharged through said tube and circuit when the tube is rendered conductive, said discharge circuit having parameters giving it a character approaching that of a critically damped circuit.

RALPH E. STURM.

REFERENCES CITED

The following references are of record in the file of this patent:

UNITED STATES PATENTS

| Number | Name | Date |
| --- | --- | --- |
| 834,998 | Ryan | Nov. 6, 1906 |
| 1,870,975 | Ulrey | Aug. 9, 1932 |
| 2,078,792 | Fitzgerald | Apr. 27, 1937 |
| 2,098,695 | Southwick | Nov. 9, 1937 |
| 2,193,945 | Strauss et al. | Mar. 19, 1940 |
| 2,227,135 | Hollman | Dec. 31, 1940 |
| 2,262,936 | Hollman | Nov. 18, 1941 |
| 2,294,015 | Salb et al. | Aug. 25, 1942 |

FOREIGN PATENTS

| Number | Country | Date |
| --- | --- | --- |
| 441,057 | Great Britain | Jan. 13, 1936 |

Certificate of Correction

Patent No. 2,457,744. December 28, 1948.

RALPH E. STURM

It is hereby certified that errors appear in the printed specification of the above numbered patent requiring correction as follows:

Column 4, line 65, for "ampliled" read *amplified*; column 5, line 26, for "derection" read *direction*; column 7, line 34, for "amplified 20" read *amplifier 20*; line 73, for the word "which" read *switch*;

and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*